United States Patent
Scholl et al.

(10) Patent No.: US 6,831,147 B1
(45) Date of Patent: Dec. 14, 2004

(54) UV-STABLE POLYCARBONATES OPTIONALLY MIXED WITH KNOWN AROMATIC POLYCARBONATES, PRODUCTION THEREOF AND USE THEREOF

(75) Inventors: Thomas Scholl, Bergisch Gladbach (DE); Peter Bier, Krefeld (DE)

(73) Assignee: Bayer AG, Leverkusen (DE)

( * ) Notice: Subject to any disclaimer, the term of this patent is extended or adjusted under 35 U.S.C. 154(b) by 1826 days.

(21) Appl. No.: 08/438,516

(22) Filed: May 10, 1995

(30) Foreign Application Priority Data

May 20, 1994 (DE) .......................................... P4417748

(51) Int. Cl.[7] .................... C08G 64/14; C08G 64/24; C08G 64/30
(52) U.S. Cl. .................... 528/201; 528/203; 525/467
(58) Field of Search ........................ 528/201, 203; 525/467

(56) References Cited

U.S. PATENT DOCUMENTS

| | | | |
|---|---|---|---|
| 3,214,436 A | | 10/1965 | Boyle et al. |
| 4,153,780 A | * | 5/1979 | Narita .................... 528/199 |
| 4,260,719 A | * | 4/1981 | Ching .................... 528/203 |
| 4,952,664 A | * | 8/1990 | Masumoto ............. 528/199 |
| 5,086,097 A | * | 2/1992 | Jorissen ................. 524/91 |
| 5,523,379 A | * | 6/1996 | Rosenquist ............ 528/201 |

FOREIGN PATENT DOCUMENTS

| | | |
|---|---|---|
| EP | 0057160 | 8/1982 |
| EP | 0338355 | 10/1989 |
| EP | 0575177 | 12/1993 |
| FR | 2215440 | 5/1995 |
| JP | 107779 | * 4/1994 .................. 528/201 |
| JP | 107805 | * 4/1994 |
| JP | 145330 | * 5/1994 |

OTHER PUBLICATIONS

Chemical Abstracts, JP 06107779 (1994).
Derwent Abstracts, JP 06107805 (1994).
Chemical Abstracts, JP 06145330 (1994).
Patent Abstracts of Japan, JP 4005291 (Apr. 13, 1992).
Chemical Abstracts 120:108473, (1993).
Chemical Abstract 122:32910.

* cited by examiner

*Primary Examiner*—David J. Buttner
(74) *Attorney, Agent, or Firm*—Connolly Bove Lodge & Hutz LLP

(57) ABSTRACT

The present invention provides UV-stable polycarbonates, optionally mixed with known aromatic polycarbonates, the production and use thereof, wherein the polycarbonates contain terminal groups of the formula (Ia)

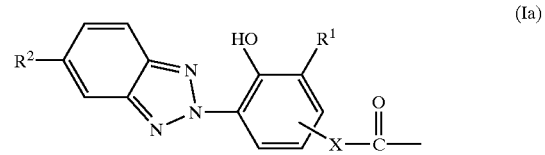

(Ia)

5 Claims, No Drawings

UV-STABLE POLYCARBONATES OPTIONALLY MIXED WITH KNOWN AROMATIC POLYCARBONATES, PRODUCTION THEREOF AND USE THEREOF

The present invention provides a process for the production of aromatic polycarbonates with UV-absorber terminal groups and with average molecular weights $\overline{M}_w$ (weight average, determined by light scattering) of between 1500 and 150000, optionally mixed with known aromatic polycarbonates with $\overline{M}_w$ (weight average, determined by light scattering) of between 1500 and 150000, from diphenols, 0.001 mol to 1 mol, preferably 0.01 mol to 0.5 mol per mol of diphenol of chain terminators, carbonic acid donors and optionally branching agents using the known polycarbonate production methods, the phase interface process, the homogeneous solution process (known as the pyridine process) or the melt transesterification process, which process is characterised in that chain terminators of the formula (I) are used

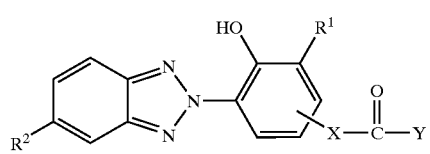

(I)

in which $R^1$ means H, $C_1$–$C_{18}$, alkyl, $C_3$–$C_6$ cycloalkyl and $C_6$–$C_{10}$ aryl, $R^2$ means H, Cl and $C_1$–$C_{12}$ alkyl, X means a single bond, $C_1$–$C_{12}$ alkylene, $C_5$–$C_6$ cycloalkylene and $C_6$–$C_{10}$ arylene and Y means a residue reactive under the reaction conditions of polycarbonate production, optionally combined with other known chain terminators.

In the case of the phase interface process, Y is OH, Cl, O-(alkali), O-ammonium or O-½(alkaline-earth), i.e. (I) is thus used as carboxylic acid, as carboxylic acid chloride, as carboxylic acid alkali salt, as carbonium-ammonium salt or as carboxylic acid alkaline-earth salt.

In the case of the pyridine process, Y has the same meaning as above for the phase interface process.

In the case of the melt transesterification process, Y also has the same meaning as above for the phase interface process and additionally means —O—$C_6$–$C_{10}$ aryl and $C_1$–$C_6$ alkyl-substituted —O—$C_6$–$C_{10}$ aryl.

Furthermore, in the case of the transesterification process, Y may also be a bifunctional arylene-bis-oxy residue, which gives rise to a chain terminator of the formula (II)

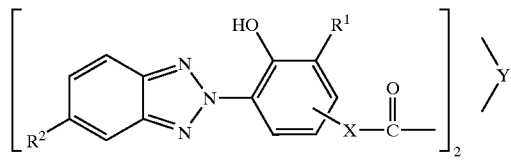

(II)

in which $R^1$, $R^2$ and X have the meaning stated for the formula (I) and —Y— is a biphenolate residue of the formula (III)

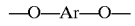

—O—Ar—O— (III)

in which —Ar— is a $C_6$–$C_{30}$ arylene, which is monocyclic or polycyclic, preferably dicyclic, wherein in the case of the dicyclic arylene residues, these may be bridged by $C_1$–$C_8$ alkylene, $C_2$–$C_8$ alkylidene, $C_5$–$C_6$ cycloalkylene and $C_5$–$C_{10}$ cycloalkylidene. Heteroatoms such as —O— or —S— may also act as bridging members.

Preferred biphenolate residues —Y— are residues derived from the diphenols of the polycarbonates to be produced, thus for example (IIIa)–(IIId)

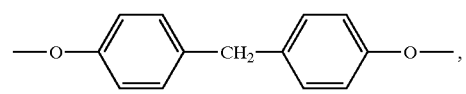

(IIIa)

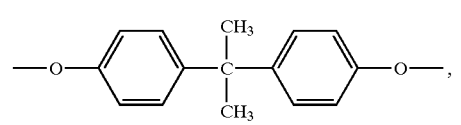

(IIIb)

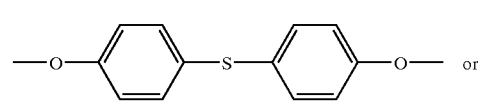

(IIIc)

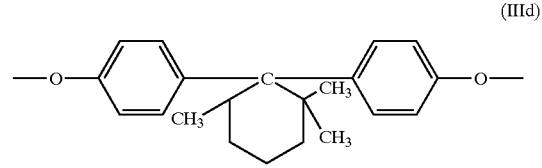

(IIId)

In the case of chain terminator (II), the reactive, molar quantity of chain terminator is in each case twice as high as in (I), such that when synthesising polycarbonate using chain terminator (II) instead of (I), the molar quantity to be used may be halved.

The present invention thus also provides a variant of the melt transesterification process according to the invention, which is characterised in that, instead of the chain terminator of the formula (I), the chain terminator of the formula (II) is used in half the molar quantity calculated for the chain terminator (I).

The chain terminators of the formulae (I) and (II) are either known from the literature or obtainable using processes known from the literature, for example in accordance with the following reaction scheme:

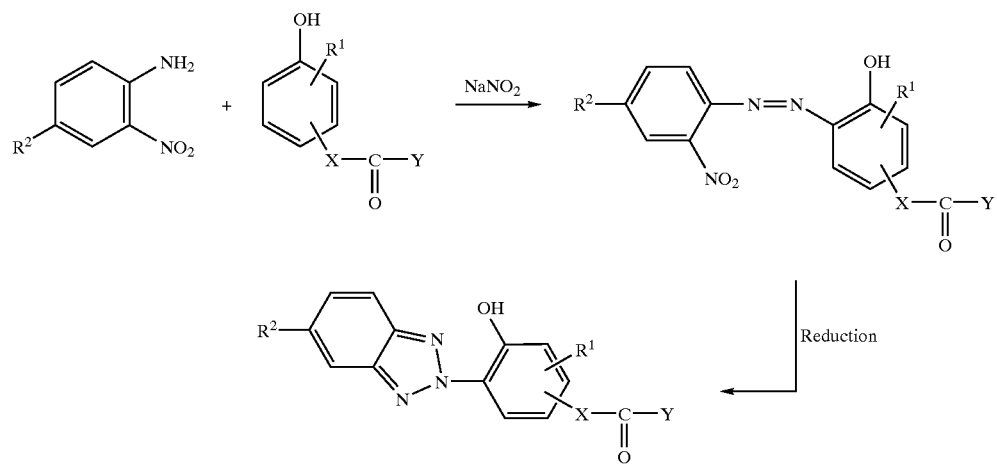
See in this connection, for example, EP-B-0 057 160, page 7.
Preferred compounds of the formula (I) are, for example:
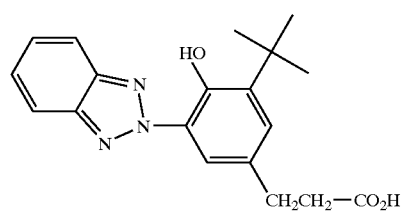
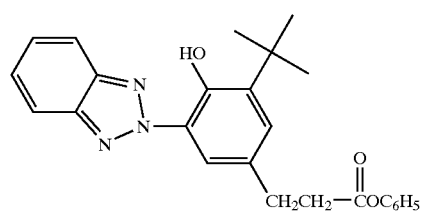
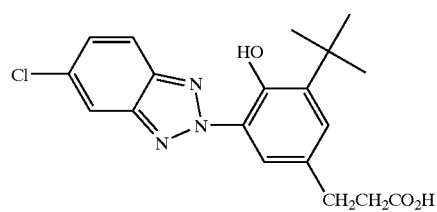
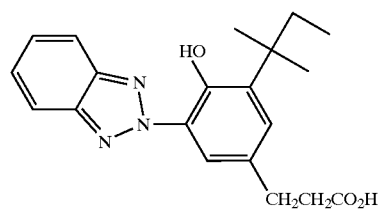
-continued
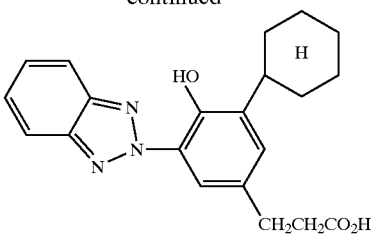
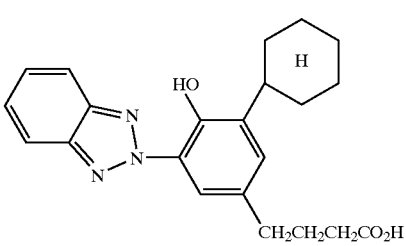
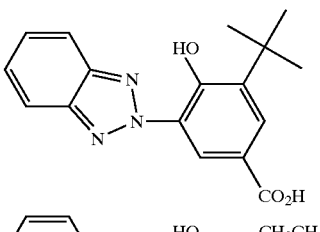
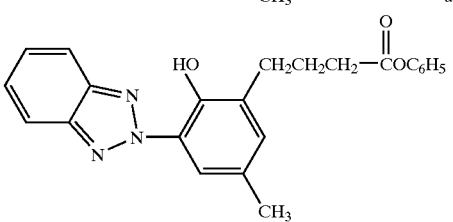
and A preferred compound of the formula (II) is

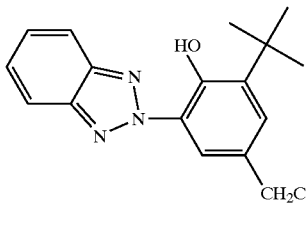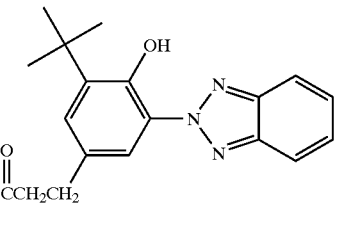

Other known chain terminators which are also to be used in the process according to the invention are, for example, phenols, carboxylic acid halides, sulphonic acid chlorides or chloroformic acid esters.

Examples of the known chain terminators which are also to be used are phenol, p-tert.-butylphenol, 2,6-dimethylphenol, p-isooctylphenol, acetyl chloride and benzoyl chloride.

The present invention moreover provides the aromatic polycarbonates obtainable using the process according to the invention with terminal groups of the formula (Ia)

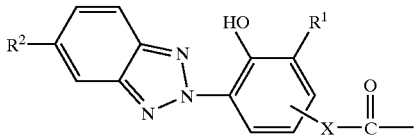

(Ia)

in which $R^1$, $R^2$ and X have the meaning stated for formula (I), with $\overline{M}_w$ (weight average, determined by light scattering) of between 1500 and 150000, optionally mixed with known aromatic polycarbonates with $\overline{M}_w$ (weight average, determined by light scattering) of between 1500 and 150000, which result from chain termination with the other, known chain terminators.

Aromatic polycarbonates with average molecular weights $\overline{M}_w$ (weight average determined by light scattering) of between 1500 and 150000 obtainable according to the invention are preferably those of the formula (IV)

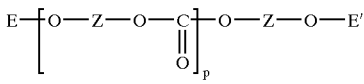

(IV)

in which

—O—Z—O— is a diphenolate residue with 6 to 30 C atoms,

E and E' are identical or different and wherein at least one of the residues E and E' corresponds to a residue of the formula (Ia)

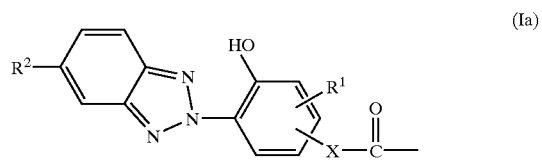

(Ia)

in which $R^1$, $R^2$ and X have the meaning stated for formula (I), and wherein the remaining terminal groups E and E' result from the reaction with the other known chain terminators, optionally including phosgene and wherein "p" is the degree of polymerisation, which results from the molecular weights $\overline{M}_w$ of 1500 to 150000.

The proportion by weight of the terminal groups of the formula (Ia) in the polycarbonates or polycarbonate mixtures according to the invention is between 40 wt. % and 0.1 wt. %, preferably between 0.2 wt. % and 10 wt. %.

The polycarbonates or polycarbonate mixtures according to the invention have good resistance against the action of UV radiation; they are thus, for example, well suited to the production of lamp covers and in the form of sheet for roofing, in particular for exterior applications, for example for greenhouses.

DE-OS 3 903 487 describes polycarbonates in which special phthalimide-substituted hydroxyphenylbenzotriazoles are used as chain terminators. Unlike the compounds of the present application, the compounds used here as chain terminators do not bear any further functional groups, other than the phenolic hydroxyl group, which may be incorporated. These groups are thus incorporated into the polycarbonate molecule. In contrast, the phenolic hydroxyl group of the chain terminators (I) and (II) of the process according to the invention are not incorporated into the polycarbonate molecule.

According to Japanese published patent 04-05291 of 9.1.1992, benzotriazoles of the following formula

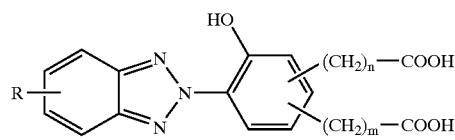

in which

R is H, halogen, low alkyl or alkoxy and one index "n" or "m" is 0 to 16 and the other is 2 to 16, are condensed into polymers, for example into polyethylene terephthalates. The benzotriazoles are chemically incorporated and cannot be extracted with solvents.

In contrast, the benzotriazoles to be used according to the invention act as chain terminators in polycarbonate synthesis.

EP 51 160 describes inter alia the incorporation of a benzotriazolecarboxylic acid into an alkyd resin: in a polyester system prepared from aliphatic monomer units, such as an alkyd resin, the use of another monofunctional aliphatic unit, such as the benzotriazolecarboxylic acid in practical example IV, pages 27–31 is not unusual. In a system prepared from aromatic diols, such as the bisphenols of the present invention, also using an aliphatic benzotriazolecarboxylic acid is novel and not obvious, as it is known that aromatic OH groups are considerably less readily esterifiable than aliphatic OH groups. Under the more severe reaction conditions to be used in this case, it is surprising that the hydroxyl group on the benzotriazole is not condensed, but the carboxyl group is.

In the case of the phase interface process and the homogeneous solution process, the preferred carbonic acid donor is $COCl_2$, in the case of the melt transesterification process it is diphenyl carbonate.

Diphenols of the formula (V) suitable for the production of the polycarbonates according to the invention

HO-Z-OH    (V)

preferably with 6 to 30 C atoms are both monocyclic and polycyclic diphenols which may contain heteroatoms and may have substituents which are inert under the conditions of polycarbonate production and thermal treatment thereof.

Examples which may be cited are hydroquinone, resorcinol, dihydroxydiphenyl, bis-(hydroxyphenyl)alkanes, bis-(hydroxyphenyl)cycloalkanes, bis-(hydroxyphenyl)-sulphides, ethers, ketones, sulphoxides, sulphones and α,α-bis-(hydroxyphenyl)diisopropylbenzenes, together with ring-alkylated and ring-halogenated compounds thereof.

Suitable diphenols are, for example, described in U.S. Pat. Nos. 3,028,365, 2,999,835, 3,062,781, 3,148,172 and 4,982,014, in German published patent applications 1 570 703 and 2 063 050 and in the monograph by H. Schnell *Chemistry and Physics of Polycarbonates*, Interscience Publishers, New York, 1964.

Preferred diphenols are
4,4',-dihydroxydiphenyl,
2,2-bis-(4-hydroxyphenyl)propane,
2,4-bis-(4-hydroxyphenyl)-2-methylbutane,
1,1-bis-(4-hydroxyphenyl)cyclohexane,
α,α-bis-(4-hydroxyphenyl)-p-diisopropylbenzene,
2,2-bis-(3-methyl-4-hydroxyphenyl)propane,
2,2-bis-(3-chloro-4-hydroxyphenyl)propane, bis-(3,5-dimethyl-4-hydroxyphenyl)methane,
2,2-bis-(3,5-dimethyl-4-hydroxyphenyl)propane, bis-(3,5-dimethyl-4-hydroxyphenyl)sulphone,
2,4-bis-(3,5-dimethyl-4-hydroxyphenyl)-2-methylbutane,
1,1-bis-(3,5-dimethyl-4-hydroxyphenyl)cyclohexane,
α,α'-bis-(3,5-dimethyl-4-hydroxyphenyl)-p-diisopropylbenzene,
1,1-bis-(4-hydroxyphenyl)-3,3,5-trimethylcyclohexane,
1,1-bis-(4-hydroxyphenyl)-3-methylcyclohexane,
1,1-bis-(4-hydroxyphenyl)-3,3-dimethylcyclohexane,
1,1-bis-(4-hydroxyphenyl)-4-methylcyclohexane,
2,2-bis-(3,5-dichloro-4-hydroxyphenyl)propane and
2,2-bis-(3,5-dibromo-4-hydroxyphenyl)propane.

Particularly preferred diphenols are, for example:
2,2-bis-(4-hydroxyphenyl)propane,
2,2-bis-(3,5-dimethyl-4-hydroxyphenyl)propane,
2,2-bis-(3,5-dichloro-4-hydroxyphenyl)propane,
2,2-bis-(3,5-dibromo-4-hydroxyphenyl)propane,
1,1-bis-(4-hydroxyphenyl)cyclohexane.
1,1-bis-(4-hydroxyphenyl)-3,3,5-trimethylcyclohexane,
1,1-bis-(4-hydroxyphenyl)-3-methylcyclohexane,
1,1-bis-(3,5-dimethyl-4-hydroxyphenyl)-4-methylcyclohexane.

In particular, 2,2-bis-(4-hydroxyphenyl)propane and 1,1-bis-(4-hydroxyphenyl)-3,3,5-trimethylcyclohexane are preferred.

Any desired mixtures of the above-stated diphenols may also be used.

In order to improve flow characteristics, small quantities, preferably quantities of between 0.05 and 2.0 mol. % (related to mol of diphenols used), of trifunctional or greater than trifunctional compounds, in particular those with three or more than three phenolic hydroxyl groups, may also be used in a known manner. Some of the usable compounds with three or more than three phenolic hydroxyl groups are, for example, 1,3,5-tri-(4-hydroxyphenyl)benzene, 1,1,1-tri-(4-hydroxyphenyl)ethane, 2,6-bis-(2-hydroxy-5'-methyl-benzyl)-4-methylphenol, 2-(4-hydroxyphenyl)-2-(2,4-dihydroxyphenyl)propane, hexa-(4-(4-hydroxyphenyl-isopropyl)phenyl)-ortho-terephthalic acid ester, tetra-(4-hydroxyphenyl)methane and 1,4-bis-(4',4"-dihydroxy-triphenyl)methylbenzene. Other trifunctional compounds include 2,4-dihydroxybenzoic acid, trimesic acid, cyanuric chloride and 3,3-bis-(4-hydroxy-3-methylphenyl)-2-oxo-2,3-dihydroindole.

Production of the polycarbonates or polycarbonate mixtures according to the invention using the solution process (c.f. H. Schnell, *Chemistry and Physics of Polycarbonates*, Polymer Review, vol. IX, page 27 et seq., Interscience Publ. 1964) may be explained as follows:

1. Disperse phase solution process (known as the two phase interface process):

In this process, the diphenols to be used are dissolved in an alkaline aqueous phase. To this end, the chain terminators, dissolved in an organic solvent or in bulk, which are necessary for the production of the polycarbonates according to the invention are added in quantities of 0.01 mol to 1 mol per mol of diphenol. The mixture is then reacted with phosgene in the presence of an inert organic phase, which preferably dissolves polycarbonate. The reaction temperature is between 0° C. and 40° C.

The necessary chain terminators may also be added in the manner and quantity stated above during phosgenation.

Suitable organic solvents for the chain terminators are, for example, methylene chloride, chlorobenzene, mixtures of methylene chloride and chlorobenzene, acetone, acetonitrile, toluene.

The reaction may also be promoted by catalysts such as tributylamine or triethylamine. In order to promote incorporation of the chain terminator, it is also possible to use onium salts, such as for example tetraalkylammonium halides, as phase transfer catalysts.

If branching agents are also used, they may be added before the reaction with phosgene or during phosgenation.

In addition to or instead of the diphenols, it is also possible to use the chloroformic acid esters thereof.

2. Homogeneous phase solution process (also known as the pyridine process):

In this process, the diphenols are dissolved in organic bases such as pyridine, optionally with the addition of the further organic solvents; then, as described under 1., the chain terminators necessary for the production of the polycarbonates according to the invention are added in quantities of 0.01 mol to 1 mol related to 1 mol of diphenol at room temperature.

The mixture is then reacted with phosgene. The reaction temperature is between 0° C. and 40° C. Suitable organic bases other than pyridine are, for example, triethylamine, tributylamine; suitable solvents are, for example, methylene chloride, chlorobenzene, toluene or mixtures of methylene chloride and chlorobenzene or toluene.

In process variants 1 and 2, the polycarbonates according to the invention are isolated in a known manner. Suitable working-up process are in particular precipitation, spray drying and evaporation of the solvent under a vacuum.

If branching agents are used, the procedure is as described under 1.

In addition to the diphenols, it is also possible to use up to 50 mol. %, related to the diphenols used, of the bischloroformic acid esters thereof.

Production of the polycarbonates or polycarbonate mixtures according to the invention using the melt transesterification process may, for example be performed as follows:

Diphenols, chain terminators, diphenyl carbonate and optionally branching agents are melted and mixed and heated to temperatures of 140° C. to 200° C. under standard pressure. After adding catalysts, the temperature is raised to 240° C. over a period of 1 to 3 hours and the pressure reduced to 10 mbar, while phenol is distilled off. Finally, the temperature is raised to 240° C. to 320° C. and the pressure reduced to <1 mbar and the polycondensation reaction continued for a further 1 to 2 hours. On completion of the reaction, the melt is cooled and the vacuum relieved. The resultant polycarbonate is isolated in a customary manner, for example by discharge through an extruder and pelletisation.

Suitable transesterification catalysts are the known alkali and alkaline-earth bases or salts, which are used in quantities of $5 \times 10^{-8}$ mol to $8 \times 10^{-7}$ mol per mol of diphenol, wherein the catalyst may be added in a single portion or divided into two portions.

Examples of catalysts are sodium hydroxide, potassium hydroxide, lithium hydroxide, sodium carbonate, potassium carbonate, lithium carbonate, sodium acetate, potassium acetate, lithium acetate, sodium stearate, potassium stearate, sodium borohydride, lithium borohydride, sodium phenyl borate, sodium benzoate, potassium benzoate, lithium benzoate, sodium borohydride, potassium borohydride, lithium borohydride, disodium hydrogen phosphate, dilithium, disodium, dipotassium salts of bisphenol A and the lithium, sodium, potassium salts of phenol. Examples of suitable alkaline-earth metal compounds are calcium hydroxide, barium hydroxide, magnesium hydroxide, strontium hydroxide, calcium acetate, barium acetate, calcium hydrogen carbonate, magnesium hydrogen carbonate, calcium carbonate, magnesium carbonate. The catalysts may be used alone or as a mixture.

If the compounds of the structure (I) are used as an alkali or alkaline-earth salt, this salt may optionally perform the function of the catalyst. Further addition of catalyst may then be dispensed with.

In addition to the stated alkali and alkaline-earth catalysts, it is also possible to add basic compounds containing nitrogen which decompose or evaporate at relatively elevated temperatures. Examples of such compounds are tetramethylammonium hydroxide, tetraethyleneammonium hydroxide, tetrabutylammonium hydroxide, trimethylbenzylammonium hydroxide, tetrabutylammonium borohydride and tetrabutylammonium-tetraphenyl borate. These compounds containing nitrogen are preferably used in quantities of $1 \times 10^{-6}$ to $1 \times 10^{-1}$ mol per mol of diphenol.

Boric acid or boric acid esters may moreover also be used. Suitable borates are of the structure $$B(OR)_n(OH)_{3-n}$$

in which

R denotes an alkyl or aryl residue and n denotes an integer from 1 to 3.

Examples of these compounds are trimethyl borate, triethyl borate, tributyl borate and trinaphthyl borate. These catalysts are used in quantities of $1 \times 10^{-8}$ to $1 \times 10-1$ per mol of diphenol.

The three stated catalysts (metal, amine, borate) may be used alone or in combination.

The polycarbonates or polycarbonate mixtures according to the invention may be used as such or also mixed with other polycarbonates containing no terminal groups of the formula (Ia). They may moreover be used for the production of polycarbonate blends. Preferred polycarbonate blends are, for example, PC/ABS, PC/ASA, PC/PBT or PC/PET blends. Such blends are, for example, described in Becker, Braun *Kunststoff Handbuch* volume 3/2, pages 149 et seq., Carl Hanser Verlag, Munich 1993.

The polycarbonates according to the invention may moreover contain further additives of a customary nature, such as reinforcing agents and fillers, flame retardants, dyes, pigments, lubricants and release agents, antioxidants or also further, unbound light stabilisers.

The polycarbonates according to the invention may be processed, in a known manner, into fibres, films, sheet, injection moulded and extruded articles. Extrusion may, for example, be used to produce solid sheets, which, as already mentioned, are used as glazing in the construction of high-rise buildings and greenhouses. Polycarbonates according to the invention with 0.05 to 1 wt. % of terminal groups of the formula (Ia) are preferably used for this purpose.

One application of the polycarbonates stabilised against UV light according to the invention with terminal groups of the formula (Ia) is also the production of multi-layer plastic sheet using the (multiple) coextrusion process, in which the supporting core layer consists, for example, of ABS, linear or branched polystyrene, preferably linear or branched polycarbonate and the polycarbonates containing the terminal groups of the formula (Ia) according to the invention are applied onto one or both sides of the core layer. For this application, the polycarbonates preferably contain between 1 wt. % and 15 wt. % of terminal groups of the formula (Ia), preferably 5 to 10 wt. %.

The thickness of the UV absorption layer should be between $10\mu$ and $50\ \mu m$. Another outer layer of 10 to 30 $\mu m$ substantially containing no UV absorber may be applied to side away from the core layer.

Thanks to their unchanged elevated glass transition temperature and melt viscosity, the UV-protected polycarbonates or polycarbonate mixtures according to the invention have particular processing advantages in the last-stated application (coextrusion) over polycarbonates with added UV absorbers, the glass transition temperature and melt viscosity of which may be unfavourably influenced by increasing contents of UV absorbers.

The present invention thus also provides the use of the polycarbonates according to the invention with terminal groups of the formula (Ia) for the production of sheet, such as solid sheet or multi-wall sheets.

The present invention moreover provides the use of the polycarbonates according to the invention with terminal groups of the formula (Ia) for the production of multi-layer plastic sheet by coextrusion, wherein at least one of the outer layers of these plastic sheets consists of the polycarbonates according to the invention with terminal groups of the formula (Ia), has a content of the terminal groups of the formula (Ia) of 1 wt. % to 15 wt. %, preferably of 5 wt. % to 10 wt. % and a thickness of 10 μm to 50 μm, preferably of 20 μm to 40 μm.

Such multi-layer plastic sheets are also used as glazing in the construction of high-rise buildings and greenhouses.

EXAMPLES

A: UV-absorbing Starting Products

A1: 2-(2-hydroxy-3-tert.-butyl-5-(2-carboxyethyl)phenyl-benzotriazole melting point 195° C. (produced in a similar manner to EP 57 160, example 1)

A2: 2-(2-hydroxy-3-tert.-butyl-5-(2-phenoxycarbonylethyl)-phenylbenzotriazole 33.9 g (0.1 mol) of compound A1 and 21.4 g (0.1mol) of diphenyl carbonate are heated together to 240° C. for four hours, with elimination of phenol. A vacuum of 20 mm is then applied for one hour and the remaining product recrystallised from cyclohexane. White crystals with a melting point of 110° C.

A3: 2-(2-hydroxy-3-cyclohexyl-5(3-carboxypropyl)-phenyl-benzotriazole (a) 132 g (0.75 mol) of 2-cyclohexylphenol are dissolved in 800 ml of dry chlorobenzene. 200 g (1.5 mol) of $AlCl_3$ are then added at 5–10° C. and then a solution of 73.5 g (0.75 mol) of maleic anhydride in 400 ml of chlorobenzene at 0–10° C. After 12 hours at room temperature, the mixture is poured into iced water and acidified with concentrated HCl. 85 g of a yellow powder with a melting point of 187–190° C. are obtained.

(b) 34.5 g (0.25 mol) of o-nitroaniline are stirred into 300 ml of water and 69 ml of concentrated HCl. A solution of 17.3 g (0.25 mol) of sodium nitrite in 155 ml of water is then added dropwise at 5° C. This solution is then added dropwise at 5° C. to a solution of 68.5 g (0.25 mol) of the compound from stage A3 (a) and 79.5 g (0.75 mol) of sodium carbonate in 1 liter of water. 117 g of a brown solid with a melting point of 155° C. are obtained.

(c) 42.5 g (0.1 mol) of the azo dye from stage A3 (b) are combined with 200 ml of 2 n NaOH. 50 g of zinc dust are then added and 80 ml of 10 n NaOH are then allowed to run in within an hour such that the temperature remains below 45° C. The mixture is then heated for four hours to 90° C., filtered and the filtrate acidified with HCl. After recrystallisation from cyclohexane, 31 g of 2-(2-hydroxycyclohexyl-5-(3-carboxypropyl) phenylbenzotriazole are produced as colourless crystals with a melting point of 165° C.

B. Production of a Polycarbonate

The following substances were introduced into a 500 ml stirred vessel with V2A stirrer, nitrogen supply, column and distillation condenser:

| | |
|---|---|
| 114.1 g | bisphenol A |
| 5.12 g | compound A1 |
| 112.46 g | diphenyl carbonate |
| 6.35 mg | sodium phenolate |

The reaction mixture was heated to 180° C. under nitrogen. The temperature was raised to 300° C. within 2 hours, wherein phenol was eliminated from approximately 240° C. After 45 minutes at 300° C., a vacuum of <1 mbar was applied and the mixture condensed for a further 30 minutes at 310° C.

The resultant polycarbonate has a relative solution viscosity ($\eta rel$ 0.5% in $CH_2Cl_2$) of 1.193. Gel permeation chromatography indicates by detection at 254 nm and 330 nm that the UV light absorbing compound A2 is uniformly incorporated into the polymer as a terminal group.

C: Weather-o-meter Results

A film of 60 μm thickness was cast from the Polycarbonat with UV-absorbing terminal groups of Example B using Methylenchlorid as solvent. The film was pressed on a 4 mm polycarbonatplate (Makrolon 1143, Bayer AG). As a comparison the procedure was repeated using the same polycarbonate containing 5 weight % Methylen-bis-((2-hydroxi-5-tert.octyl-phenyl)-2H-benztriazol as UV-absorbing agent.

The plates were then subjected to a Xenotest 150 weather-o-meter test.

| | intentive sample | comparison |
|---|---|---|
| Yellowness-Index | | |
| 0 h | 4.1 | 5.2 |
| 352 h | 9.4 | 9.3 |
| Haze (%) | | |
| 0 h | 2.6 | 2.7 |
| 352 h | 15.9 | 24.8 |

By the deterioration of haze it is clearly shown that the polycarbonate with UV-absorbing terminal groups is more lightstable than the polycarbonate stabilized in a conventional manner.

What is claimed is:

1. A process for producing aromatic polycarbonates with UV-absorber terminal groups and average molecular weights $\overline{M}_w$ (weight average, determined by light scattering) of between 1,500 and 150,000 from diphenols by melt transesterification, which comprises chain-terminating the polycarbonates with chain terminators of the formula (II):

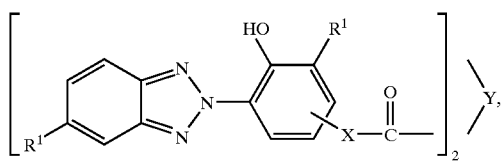

in which
R$_1$ is H, C$_1$–C$_{18}$ alkyl, C$_3$–C$_6$ cycloalkyl or C$_6$–C$_{10}$ aryl,
R$^2$ is H, Cl or C$_1$–C$_{12}$ alkyl,
X is a single bond, C$_1$–C$_{12}$ alkylene, C$_5$–C$_6$ cycloalkylene or C$_6$–C$_{10}$ arylene, and
Y is a biphenolate residue of the formula (III):

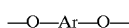    (III), in which
—Ar— is an arylene with from 6 to 30 carbon atoms and is monocyclic or polycyclic, wherein the chain terminator condenses with the polycarbonate at the carboxyl group of the chain terminator.

2. The process of claim 1, wherein Ar is dicyclic.

3. A process for producing aromatic polycarbonates with UV-absorber terminal groups having average molecular weights $\overline{M}_w$ (weight average, determined by light scattering) of between 1,500 and 150,000 from diphenols by the phase interface process, the homogeneous solution process or the melt transesterification process, which comprises chain-terminating the polycarbonates with 0.001–1 mole per mole of diphenol of chain terminators of the formulae:

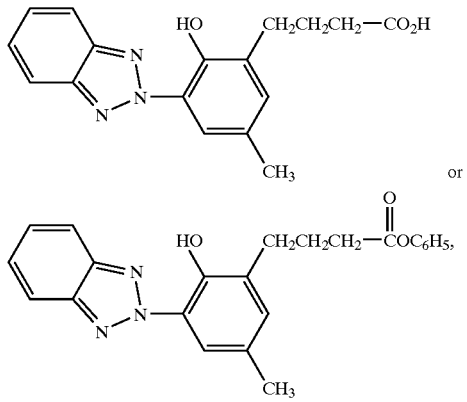

wherein
the chain terminator condenses with the polycarbonate at the carboxyl group of the chain terminator.

4. A process for producing aromatic polycarbonates with UV-absorber terminal groups having average molecular weights $\overline{M}_w$ (weight average, determined by light scattering) of between 1,500 and 150,000 from diphenols by the phase interface process, the homogeneous solution process or the melt transesterification process, which comprises chain-terminating the polycarbonates with 0.001–1 mole per mole of diphenol of chain terminators of the formula (I):

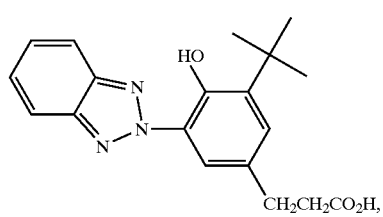

wherein
the chain terminator condenses with the polycarbonate at the carboxyl group of the chain terminator.

5. A process for producing aromatic polycarbonates with UV-absorber terminal groups having average molecular weights $\overline{M}_w$ (weight average, determined by light scattering) of between 1,500 and 150,000 from diphenols by the phase interface process, the homogeneous solution process or the melt transesterification process, which comprises chain-terminating polycarbonates with 0.001–1 mole per mole of diphenol of chain terminators of the formula (II):

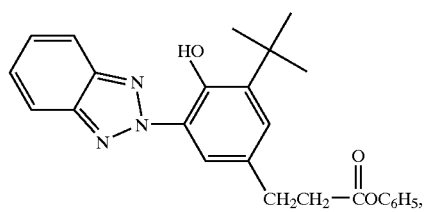

wherein
the chain terminator condenses with the polycarbonate at the carboxyl group of the chain terminator.

* * * * *

UNITED STATES PATENT AND TRADEMARK OFFICE
CERTIFICATE OF CORRECTION

PATENT NO. : 6,831,147 B1  
DATED : December 14, 2004  
INVENTOR(S) : Thomas Scholl et al.

Page 1 of 1

It is certified that error appears in the above-identified patent and that said Letters Patent is hereby corrected as shown below:

Column 13,
Lines 1-10, "

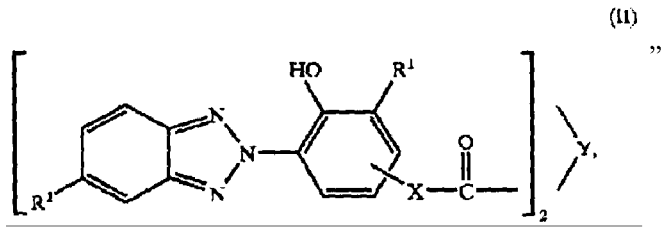

"

should read

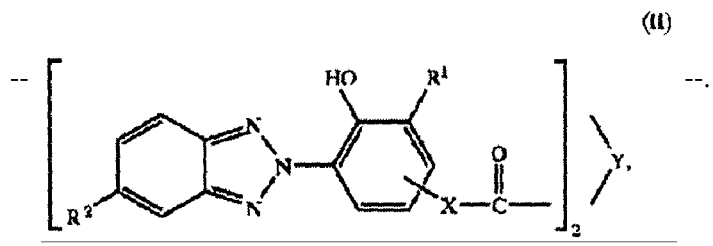

--.

Signed and Sealed this

Twenty-fourth Day of January, 2006

JON W. DUDAS  
*Director of the United States Patent and Trademark Office*